United States Patent [19]

McLean

[11] 4,269,249
[45] May 26, 1981

[54] TIRE CHAINS AND A TOOL FOR APPLYING THEM TO A TIRE

[76] Inventor: William B. McLean, 1711 Hassam Rd., Coraopolis, Pa. 15108

[21] Appl. No.: 15,665

[22] Filed: Feb. 27, 1979

[51] Int. Cl.³ .............................................. B60C 27/06
[52] U.S. Cl. ................................ 152/213 A; 81/15.8; 152/242; 24/299; 24/369
[58] Field of Search ............... 152/213 R, 213 A, 214, 152/217, 231, 239, 241, 242, 215, 216; 81/15.8; 254/74, 75, 78, 51; 59/93; 24/68 TT, 69 TT, 73 AC, 73 CE

[56] References Cited

U.S. PATENT DOCUMENTS 3,865,168   2/1975   de Previnquieres ............. 152/213 A Primary Examiner—William A. Powell
Assistant Examiner—Thomas Bokan
Attorney, Agent, or Firm—Parmelee, Miller, Welsh & Kratz

[57] ABSTRACT

An improved tire chain in which the chain length on the inner side of a tire may be remotely connected by means of a releasable connecting means. The releasable connecting means is initially engaged with a hook and a connecting link on the inner side chain, and a pull on its handle causes the hook to engage with the connecting link. In a preferred embodiment, the connecting means automatically disengages from the chain.

14 Claims, 19 Drawing Figures

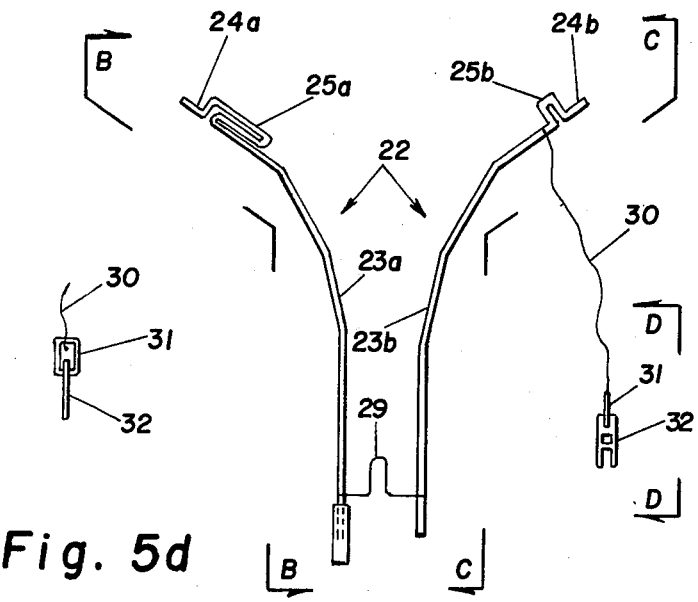
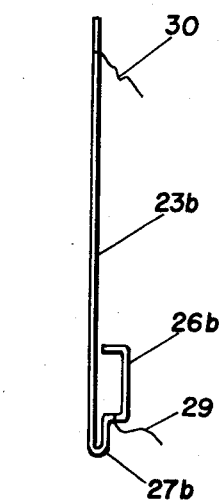
Fig. 5d  Fig. 5a  Fig. 5c
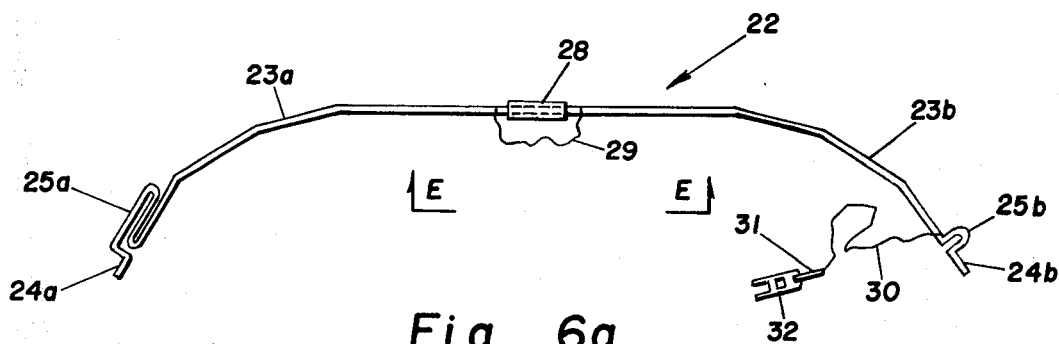
Fig. 6a
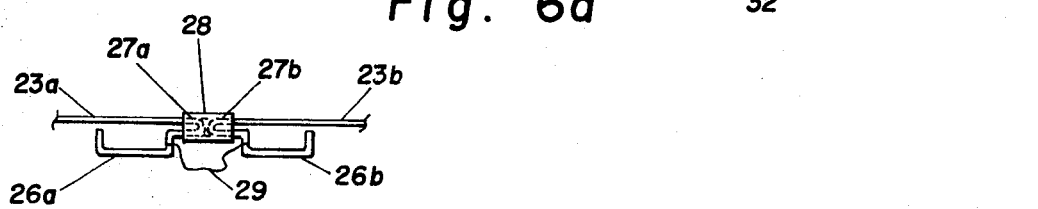
Fig. 6b
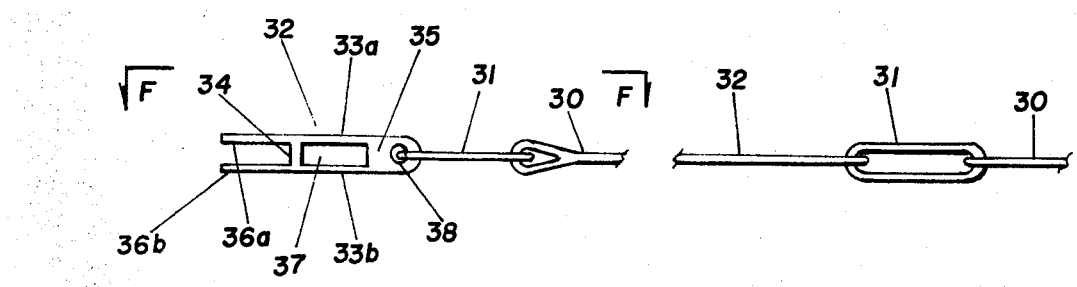
Fig. 7a  Fig. 7b

TIRE CHAINS AND A TOOL FOR APPLYING THEM TO A TIRE

BACKGROUND OF THE INVENTION

This invention relates to pneumatic tire chains and, in particular, to tire chains which may be easily applied and fastened to tires.

It is a matter of common knowledge that the use of chains on the tires of motor vehicles will improve the performance of such vehicles on road surfaces which are covered with snow or ice. Such tire chains typically consist of two parallel longitudinal lengths of chain which are connected at certain intervals by transverse lengths of chain. At one end of each of the longitudinal lengths is a hook which is connectable to a link or ring which forms the opposite end of the length. The chains may be applied to a tire by draping them over the tread section of the tire and by then attaching the hook on each longitudinal length to its corresponding link or ring.

Such a procedure is simple in concept and under commercial garage conditions, where power tools are available to reliably elevate a motor vehicle and to remove its tires, the application of tire chains is not a particularly troublesome task. On the other hand, where a motorist must apply tire chains himself, either on the roadside or at his home, the application of these chains can be a difficult, time consuming and even hazardous process. It is furthermore found that the adverse weather conditions which necessitate the use of tire chains are oftentimes not anticipated by motorists so that the emergency roadside application of these chains is not an uncommon occurrence.

The problems associated with applying tire chains on the roadside are twofold. First, because the configuration of many motor vehicles allows only limited access to the space above the tires and because of the cumbersome nature of the tire chains themselves, many motorists find it difficult to drape the chains over the tread area of the tire. For this reason, such motorists find it necessary to lay the chains out on the ground and to then take the extra step of moving their vehicle so that the tires to which the chains are to be applied rest on the chains.

Another problem associated with the roadside application of these chains is that associated with the connecting of the hook on the inner side wall of the tire with its corresponding link or ring. Because this hook lies beneath the chasis of the vehicle, it is difficult for the motorist to grip and fasten this hook unless he elects to crawl beneath his vehicle. The disadvantages of working from such a position, especially when the roadside may be covered with snow, are evident.

The problem of making this connection is aggravated by virtue of the fact that for proper operation, tire chains must fit against their tires with a reasonable degree of tightness. To ensure such a fit it is generally necessary that a certain amount of tension be placed on the chain when the hooks are being connected. The rather delicate maneuver of making the connection of the inner side hook to its corresponding link or ring is, then, made even more awkward since at the moment when the motorist must exercise the greatest amount of care so as to properly engage the hook with its connecting link or ring he must also exert a moderate amount of force on the connecting parts.

Some U.S. Patents which deal with tire chains and means by which their application may be facilitated are as follows:

U.S. Pat. No. 2,588,568 and U.S. Pat. No. 3,156,140 disclose tools by which tire chains may be draped over tires when the structure of a vehicle hampers such positioning. The tools disclosed in these patents do not, however, facilitate the connection of the inner side hook.

U.S. Pat. No. 2,984,280 discloses a tire chain in which the connecting of the outer side hook is made easier by means of springs which are connected to the hook.

U.S. Pat. No. 2,663,208 discloses a tool for applying chains. This tool drapes over the top of the tire so that, after the vehicle has been jacked off the ground, the inner side hook can be connected to its corresponding link or ring on the outside of the tire. After this connection has been made, the tool may be employed to pull the chain over the top of the tire. Among the disadvantages apparent with the use of this tool, is that the vehicle must be jacked off the ground.

U.S. Pat. No. 3,865,168 discloses a tool having two supports, one pliable and one rigid. The user of this tool engages the hook on the inner side of the tire with one support and its corresponding connecting link with the other. The link is then moved toward and over the hook so that remote fastening is effected. A disadvantage of this design is, however, apparent in that the user must maintain tension on at least one support while he is attempting the somewhat delicate task of making the final connection between the hook and its connecting link. While this design does incorporate various features which facilitate the user's control over the connecting parts, the fact remains that the user must exercise a certain amount of manual control, while the chain is under tension, to effect this coupling.

It is, then, an object of the present invention to provide tire chains on which the inner side hook may be fastened from a position to the side of the vehicle without the necessity of making manual connections while substantial tension is being applied to the inner side chain.

It is a further object of the present invention to provide tire chains which may be applied in the aforesaid manner without the necessity of moving the vehicle or jacking it off the ground.

It is a still further object of the present invention to provide tire chains which may be easily draped over a tire in a position from which such final fastening may be readily accomplished.

SUMMARY OF THE INVENTION

The present invention is a combination comprised of a tire chain and a means for draping the chain over the top of the tire and also for engaging the hook and its corresponding connecting link on the inner side longitudinal length of the chain. The tire chain provided by the present invention is similar to a standard tire chain except for the inner side hook, its connecting link and the means for engaging these elements. The connecting means is made up of a flexible cord which may be looped through the connecting link and which has at one end a terminal link. The inner side hook is specially adapted with a slot or with one or more protuberances on its bight section near its point to engage this terminal link. While these protuberances are sufficiently large to hold the terminal link in its position near the point they are small enough so that the connecting link will pass over them and become fully engaged with the bight of the hook. Further, the terminal link is of a sufficiently small size as to pass through the connecting link. Thus, when tension is applied to the flexible cord on the end opposite from the terminal link, the connecting link will be drawn toward and then engage the bight of the hook. In a preferred embodiment of the present invention, the terminal link is engaged near the point of the hook by a slot and two protuberances rising perpendicularly from the top and bottom surfaces of the hook such that when the bight of the hook engages the connecting link, the terminal link pulls free from its position near the point.

BRIEF DESCRIPTION OF THE DRAWINGS

The present invention is more fully described in the following drawings, in which:

FIG. 4b is an edge view of hook 9 taken from line A—A in FIG. 4a;

FIG. 5a is a plan view of the means for draping the chain over the tire and for engaging the hook 9 and its connecting link 8;

FIG. 5b is an edge view of the engaging means in FIG. 5a taken from line B—B in FIG. 5a;

FIG. 5c is another edge view of the engaging means shown in FIG. 5a taken from line C—C in FIG. 5a;

FIG. 5d is an edge view of part of the engaging means taken from line D—D in FIG. 5a;

FIG. 6a is a plan view of the engaging means in its connected mode;

FIG. 6b is an edge view of part of the engaging means taken from line E—E of FIG. 6a;

FIG. 7a is a detailed plan view of the terminal link 32, the standard link 31 and part of the cord 30 shown in FIGS. 5a, 5b and 6a;

FIG. 7b is a view of the terminal link 32, the standard link 31 and part of the cord 30 taken from line F—F in FIG. 7a;

DESCRIPTION OF THE PREFERRED EMBODIMENT

Figure 1:
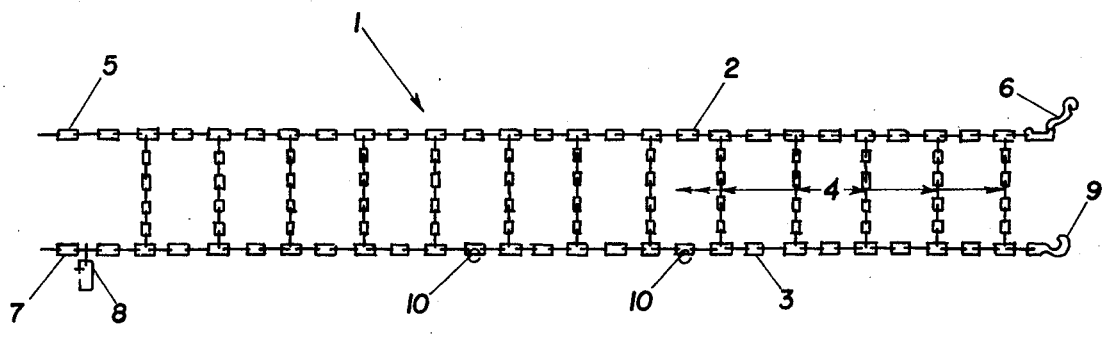
FIG. 1 is a plan view of a tire chain in which the present invention is incorporated.

Referring to FIG. 1 it may be seen that the present invention is in certain aspects similar to a standard set of tire chains. Each chain 1 of the pair contains an outer side chain 2, an inner side chain 3 and a series of transverse chains 4. An extension 5 of the outer chain 2 beyond the last cross chain provides a means for adjustably connecting the outer side chain connecting hook 6, which is on the opposite side of the same chain. Hook 6 is a standard connecting hook as is presently used on such chains. There is a similar extension 7 of the inner side chain 3. To this extension is snapped a special snap type connecting link 8, which may be snapped on to any link of extension 7 so as to adjust the length of inner side chain 3 to fit the specific tire to which the chain is being applied. On the opposite side of inner side chain 3 is a special connecting hook 9 to which link 8 is connected when the chain is on a tire. Also connected to inner side chain 3 are at least two rings 10.

Figure 2:
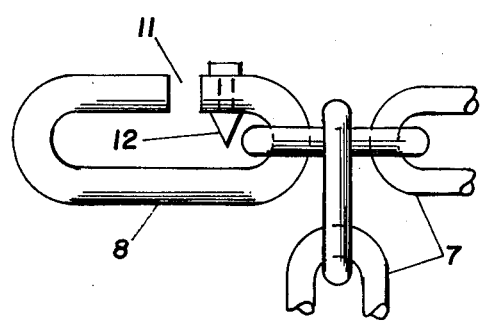
FIG. 2 is a detailed view of connecting link 8 shown in FIG. 1.
Figure 3:
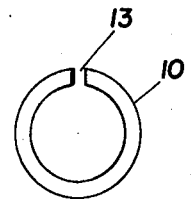
FIG. 3 is a detailed view of ring 10 shown in FIG. 1.

In FIG. 2 it will be seen that connecting link 8 has an opening 11 through which a link of extension 7 may be passed. Connecting link 8 has a flexible finger 12 which serves to secure extension 7 in the position shown in FIG. 2. Connecting link 8 may, alternatively, be a standard snap link of suitable size and shape. Ring 10 which is shown in FIG. 3 is characterized by a split 13 so that ring 10 may be opened to slide it onto a chain link and then closed again.

Figure 4A:
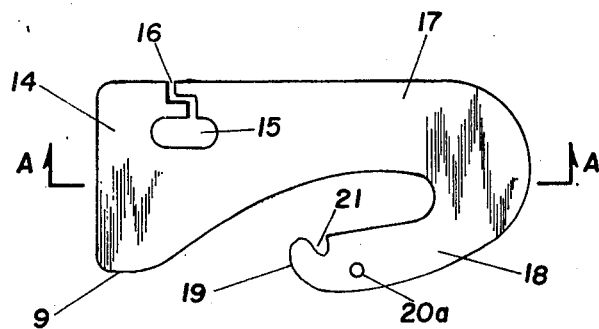
FIG. 4a is a detailed plan view of hook 9 shown in FIG. 1.
Figure 4B:
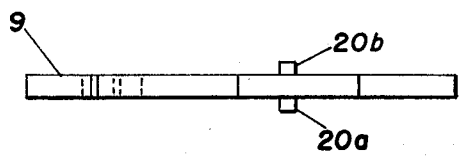
Figure 5B:
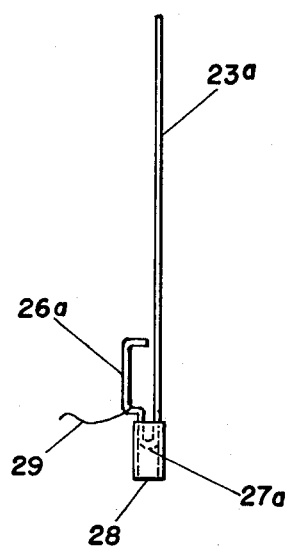

An important feature of the present invention is the connecting hook 9. As is shown in FIGS. 4a and 4b, the hook 9 includes a ring section 14 which surrounds an opening 15. By means of channel 16 and opening 15 the hook 9 may be attached to the adjoining link on the inner side chain 3. The hook 9 also includes a straight shank section 17 and a bight section 18 which first curves away from the shank section 17 and then back toward the ring section 14. The bight section 18 terminates in a point 19, which is spaced from the shank section 17. In the vicinity of the point 19 on the bight section are two protuberances 20a and 20b. Additionally, there is in this vicinity a slot 21. As will be hereinafter explained, the purpose of the protuberances 20a and 20b and the slot 21 is to engage and retain the terminal link 32 of the engaging means 22 (FIG. 5a) while the connecting link 8 is being drawn toward the hook 9. It is also noted that while it is preferred that the hook 9 include the slot 21, the apparatus is operable when the hook 9 is configured without this slot feature.

Referring to FIGS. 5a through 6b, the engaging means 22 is shown. This engaging means consists of two rods 23a and 23b, bent or shaped in the manner illustrated, and certain appurtenances as are herein described. Each rod has an extension 24a and 24b suitable for slipping into rings 10 on inner side chain 3 (FIG. 1) for the purpose of positioning the chain on a tire as will be hereinafter more fully explained. Adjacent to extension 24a is a hump 25a and adjacent to extension 24b is a hump 25b. Said humps 25a and 25b serve to prevent rings 10 (FIG. 1) from sliding beyond them, and hump 25a is formed in such a way so as to serve as a handle for the engaging means 22 when it is in its connected mode.

On the other ends of rods 23a and 23b are handles 26a and 26b. From the outer ends of the handles narrower extensions 27a and 27b are formed. Said extensions 27a and 27b are suitable for insertion into sleeve 28. Sleeve 28 may be permanently fastened to extension 27a of handle 26a. Extension 27b is constructed so that it fits into sleeve 28 when pressure is exerted on handle 26b and so that it binds to sleeve 28 when said pressure is released. FIGS. 6a and 6b show the engaging means when the rods 23a and 23b are connected in the aforedescribed manner. Between handles 26a and 26b a flexible connection 29 of string or similar material is preferably provided. This connection serves to keep the handles 26a and 26b in an advantageous close together position when the engaging means 22 is employed in its disconnected mode for the purpose of positioning the chain on a tire.

In the vicinity of hump 25b on rod 23b a string or cord 30 is attached. Attached to the outer end of cord 30 is a standard chain link 31 to which is connected special terminal link 32.

FIGS. 7a and 7b show the terminal link 32 of the engaging means 22 in greater detail. This terminal link 32 is connected to the cord 30 by a standard chain link 31. The terminal link 32 has two longitudinal bars 33a and 33b, a front transverse bar 34, a rear transverse bar 35, and extensions 36a and 36b of longitudinal bars 33a and 33b. The aforesaid bars form an aperture 37 which, as will be hereinafter explained, fits over the point 19 of hook 9. There is also an aperture 38, in rear transverse bar 35, by which standard chain link 31 is engaged.

Figure 8:
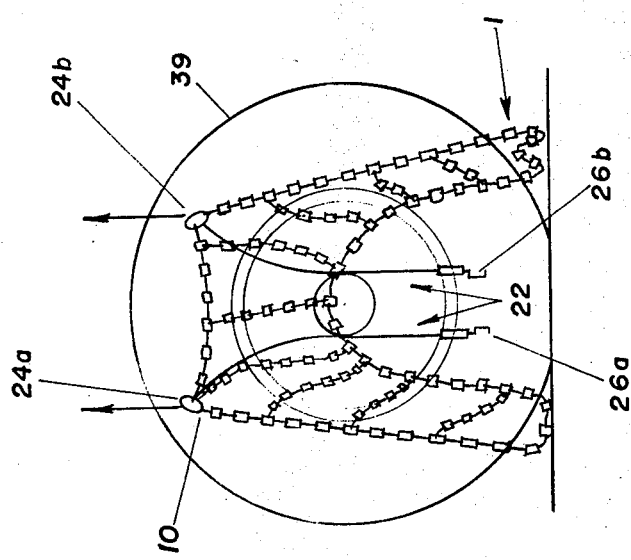
FIG. 8 is a side elevation view of a tire and the chain showing the operation of the present invention in positioning the chain on the tire.

FIG. 8 shows how the engaging means may, in its disconnected mode, be employed to drape the chain 1 over a tire 39 in a suitable position for final fastening. The chains are first laid out on the ground with the rings 10 adjacent to the tire. With the engaging means 22 in its disconnected mode, the extensions 24a and 24b are first inserted into rings 10. The chain 1 may then be lifted to a position on top of the tires and the engaging means 22 may then be retracted. If the chain is being used over a snow tire, it may be necessary to use the engaging means 22 to push the ends of the inner side chain 3 to the back of the tire. It is also noted that while the use of the rings 10 is preferred, it is also possible to drape the chain 1 over the tire by first inserting the extensions 24a and 24b into two intermediate links of inner side chain 3 and by then lifting the chain over the tire.

Referring to FIGS. 9a through 10b, the manner in which the chain is fastened after it has been positioned on top of the tire is illustrated. The engaging means 22 is first returned to its connected mode in the manner heretofore described and illustrated in FIG. 6a. The hook 9 is then connected to the terminal link 32 in the manner illustrated in FIG. 9a. That is, in further reference to FIGS. 4a and 7a, the aperture 37 of the terminal link 32 is placed over the point 19 of the hook 9. The front transverse bar 34 of the terminal link 32 fits into slot 21 of the hook 9 and the longitudinal bars 33a and 33b of the terminal link rest on protrusions 20a and 20b respectively. When the terminal link 32 is in this position, the extensions 36a and 36b of the terminal link 32 prevent the cord 30 from binding against the hook 9 by keeping the cord 30 from falling into the space between the shank 17 and the point 19. After the terminal link 32 has been connected to the hook 9, the engaging means 22 is positioned to the inside of the tire and the cord 30 inserted through the opening 11 in the connecting link so that the cord 30 passes through the connecting link 8 and the engaging means 22 is thereby positioned in the manner illustrated in FIG. 10a.

It is also noted that while the connecting link 8 is preferably constructed with an opening as at 11, it is possible to employ an ordinary chain link as the connecting link. If such an ordinary chain link is employed, the initial positioning of the engaging means 22 must be carried out in a slightly different manner. That is, the terminal link 32, the standard chain link 31 and the cord 30 are first threaded through the connecting link 8 before the terminal link 32 is connected to the hook 9.

Figure 9B:
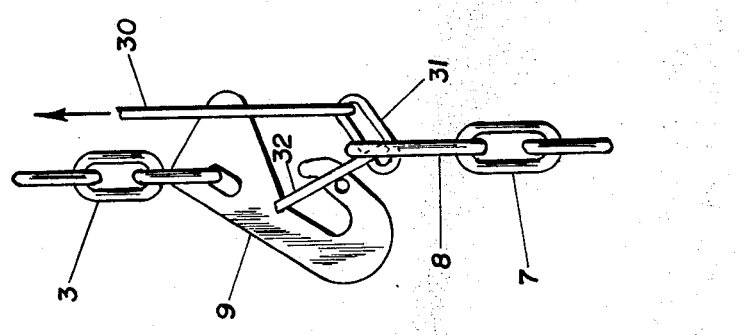
FIGS. 9a, 9b and 9c are detailed views of the part of the chains in the vicinity of hook 9 and terminal link 32.
Figure 9A:
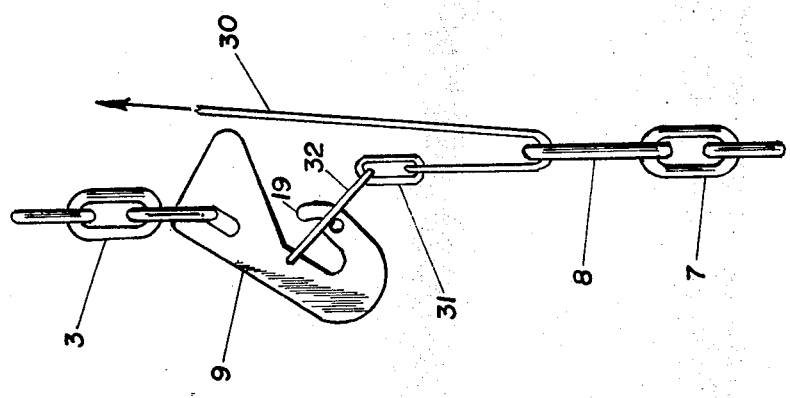
Figure 9C:
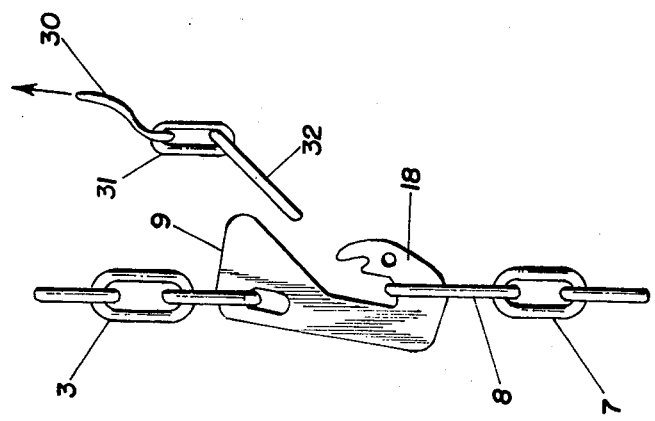

After the engaging means 22 has been positioned in the above described manner, the user pulls the connected rods 23a and 23b of the engaging means 22 away from the connecting link 8. Tension is thereby placed on the cord 30 from its end opposite the terminal link 32 and connecting link 8 is pulled toward hook 9, thus pulling the two ends of inner side chain 3 toward each other. It will be seen in FIG. 9b that as this pull continues, connecting link 8 will ride up upon link 31 and will slide across it and then up onto terminal link 32. As the pull continues further, link 32 will rotate about the central longitudinal axis of the front transverse bar 34 (FIG. 7a) and link 8 will slide down terminal link 32 and will engage the bight 18 of the hook 9, as is shown in FIG. 9c, thus connecting the inner side chain. The engagement of hook 9 with connecting link 8 also simultaneously releases terminal link 32, which is pulled free by further tension on cord 30. It will be noted that this system is operable without link 31 but that this link increases the smoothness of the connecting action. While FIGS. 9a through 9c illustrate the connecting action when link 8 is in its optimum position, it is found that the connection may also be satisfactorily accomplished when link 8 is rotated about its longitudinal axis to either the left or the right. It is also noted that it is not necessary that the cord 30 be pulled from the precise direction shown in FIG. 9a. It has been found that satisfactory results are obtained even if the cord is wound around itself and pulled across hook 9.

Figure 10B:
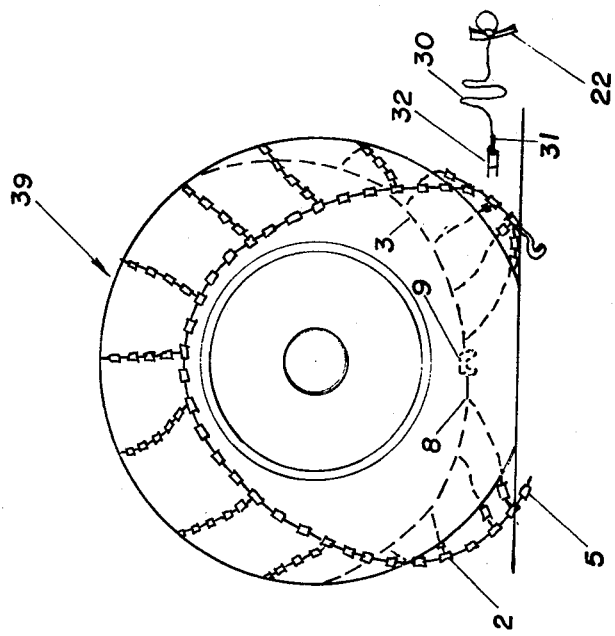
FIGS. 10a and 10b are side elevation views of the chain and a tire showing the operation of the present invention in fastening the chain to the tire. The chain is shown on the outer side of the tire in solid lines and on the inner side of the tire in broken lines.
Figure 10A:
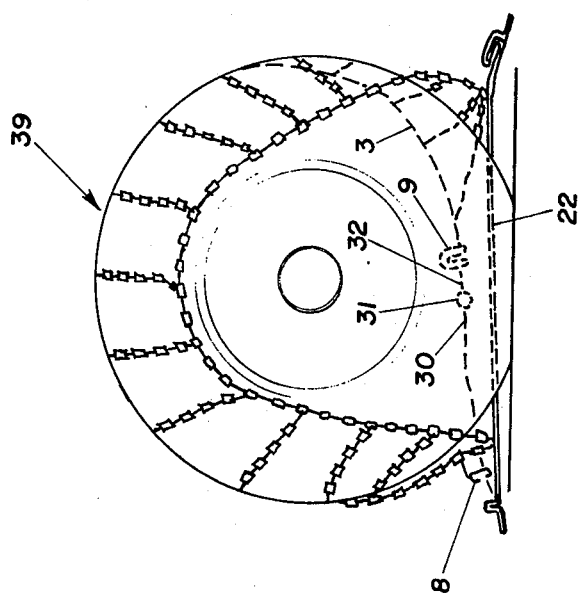

The means by which this connection of hook 9 to connecting link 8 fastens the chain 1 to the tire 39 is shown more generally in FIGS. 10a through 10b. After the cord 30 of the engaging means 22 has been passed through the connecting link 8 and the terminal link 32 has been engaged with the hook 9, a pull on the engaging means 22 from the side of the tire opposite the connecting link 8 will cause the connecting link 8 to engage with the hook 9. Thereafter, the position of the chain 1 may be adjusted as is necessary. Finally, the fastening may be accomplished by manually connecting the outer side connecting hook 6 to a link of the extension 5 of the outer side chain 2.

It will thus be seen that the objects of the present invention are efficiently attained. By means of the present invention a tire chain may be draped over the top of the tire and the inner side hook on a tire chain may be simply connected from a position on the outer side of the tire. This invention may also be employed without jacking the vehicle, thus making it especially useful in freeing stuck vehicles. Further, since all the detailed manual connections for the inner side chain are made before tension is applied to the system and since the final connection is effected by only a simple pull by the user, the user is not placed in the awkward position of applying tension to the inner side chain at the same time he is making a connection.

I claim:

1. In a tire chain having an inner side longitudinal chain, an outer side longitudinal chain, a plurality of transverse chains connecting said inner side longitudinal chain and outer side longitudinal chain at intervals and disposing said longitudinal chains in spaced, parallel relation, means for connecting one end of the outer side longitudinal chain to its opposite end, and means for connecting one end of the inner side longitudinal chain to its opposite end, the improvement comprising the combination wherein the means for connecting said ends of the inner side longitudinal chain comprises:

(a) a connecting link attached to one end of the inner side longitudinal chain;

(b) a hook having an elongated shank section attached at one end by means of a ring section to the other end of the inner side longitudinal chain and at its other end to a bight section which first curves away from the shank section, then curves toward the ring section and terminates in a point such that the hook is formed with interior and exterior arcuate surfaces, and such that the point is spaced from the shank section, said hook being further characterized by at least one protuberance on the bight section of the hook adjacent the point; and (c) means for engaging the hook in said connecting link when they are separated and require tension to bring them into engagement comprising a flexible cord and a terminal link consisting of two parallel, spaced longitudinal bars connected by front and rear transverse bars connected to one end of said flexible cord, said terminal link being passable with the cord through the connecting link and engagable with the bight section of the hook between the point and the protuberance such that as tension is applied to the other end of the cord in the direction of said hook, the connecting link is drawn toward the hook and passes over the terminal link and engages with the bight of the hook.

2. The combination of claim 1, wherein the longitudinal bars of the terminal link extend forward beyond the front transverse bar such that said longitudinal bars cross the space between the bight and the shank of the hook when said terminal link bears against the protuberance.

3. The combination of claim 2 wherein the hook is characterized by a slot cutting the plane of the interior arcuate surface adjacent the point of the hook and adapted to receive the front transverse bar of the terminal link.

4. The combination of claim 3 wherein the slot angles toward the point of the hook such that the terminal link is pulled free of the hook as the connecting link engages with the hook.

5. The combination of claim 4 wherein there are two protuberances, said protuberances being coaxial with one another and being disposed on the bight section of the hook adjacent the point.

6. The combination of claim 5 wherein the protuberances are positioned so that said longitudinal bars bear against the protuberances when the front transverse bar is engaged with the slot until the connecting link is drawn adjacent to the protuberance.

7. The combination of claim 6 wherein the terminal link is connected to the flexible cord by means of a conventional chain link.

8. The combination of claim 1 wherein the connecting link has means for attachment at any point on the inner side longitudinal chain.

9. The combination of claim 8 wherein the connecting link is oval in shape and has an opening on one of its elongated sides such that one end of said elongated side is spaced from its other end and adjacent to said opening there is attached to one end of said elongated side a flexible finger such that the connecting link may be attached and removed from conventional chain links.

10. The combination of claim 8 wherein the connecting link is a standard snap link.

11. The combination of claim 1 wherein the flexible cord is provided with a rigid elongated handle at its end opposite from the terminal link.

12. The combination of claim 11 wherein the rigid elongated handle is detachable into two similar sections, each of said sections having a handle at one end and a link engaging means at its other end such that the chain may be draped over the tire by engaging two links in the chain with said link engaging means and by lifting said chain on top of the tire.

13. The combination of claim 12 wherein at least two rings are attached to the inner side longitudinal chain such that the chain may be draped over the tire by engaging said rings with the link engaging means and by lifting said chain on top of the tire.

14. The combination of claim 13 wherein the adjacent ends of the handle sections are joined by a flexible connecting means of sufficient length to allow the handle sections to be remotely disposed.

* * * * *